Sept. 5, 1939.  A. WEILAND  2,171,999
UNIVERSAL JOINT
Filed June 23, 1938
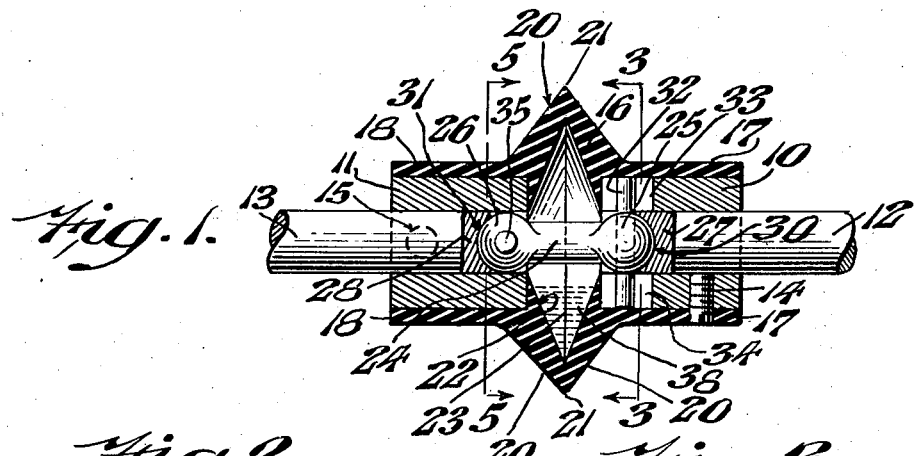
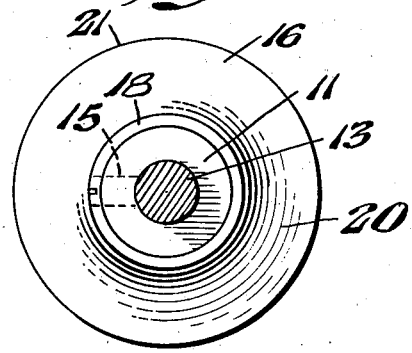
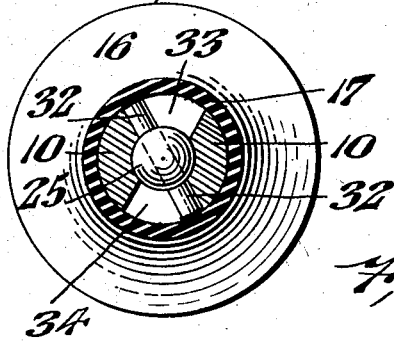
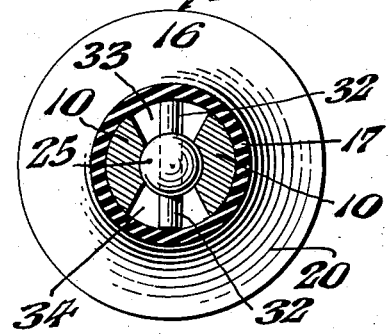
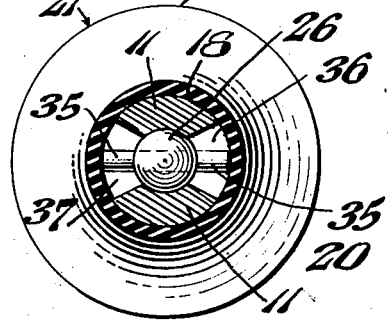
INVENTOR
ALFRED WEILAND,
BY
ATTORNEY Patented Sept. 5, 1939

2,171,999

UNITED STATES PATENT OFFICE 2,171,999

UNIVERSAL JOINT

Alfred Weiland, Philadelphia, Pa.

Application June 23, 1938, Serial No. 215,321

3 Claims. (Cl. 64—11)

The present invention relates to couplings or joints and more particularly to a universal joint for use between the meeting ends of a driving shaft and a driven shaft.

Some of the objects of the present invention are to provide an improved universal joint for joining the meeting ends of two shafts; to provide a flexible joint which automatically compensates for misalinement of shafts without loss of efficiency, undue wear, or excessive stresses and strains; to provide a universal joint of a flexible type which functions automatically to correct for angular as well as parallel misalinement of the two shafts joined by the device of the present invention; to provide a universal joint which has a stepped action from complete flexibility under normal torque and complete rigidity under excessive torque; to provide a flexible coupling having double action characteristics wherein an allowance is made for a predetermined torsional wind-up of one action while the other action remains ineffective; and to provide other improvements as will hereinafter appear.

In the accompanying drawing Fig. 1 represents a sectional elevation of a universal joint embodying one form of the present invention; Fig. 2 represents an end elevation of the same; Fig. 3 represents a section on line 3—3 of Fig. 1; Fig. 4 represents a like section but showing the parts in a different operating position, and Fig. 5 represents a section on line 5—5 of Fig. 1.

Referring to the drawing one form of the present invention consists of two oppositely and coaxially arranged torque transmitting members 10 and 11, which, as here shown, are of tubular metal construction and one of which receives the end of a driving shaft 12, while the other receives the end of a driven shaft 13. Set screws 14 and 15, or equivalent fastening means secure the members 10 and 11 to the respective shafts 12 and 13. The members 10 and 11 are interconnected by a flexible body 16 of tubular disc shape having two oppositely disposed extensions 17 and 18 which respectively seat about the members 10 and 11. The body 16 and its extensions 17 and 18 are preferably of rubber or equivalent tough resilient material and in the preferred manufacturing process the extensions 17 and 18 and the body 16 are molded about and vulcanized to the members 10 and 11. Any method, however, of anchoring the members 10 and 11 to the interconnecting body is within the scope of the invention. The body 16 is of greater diameter than the extensions 17 and 18 and while of circular shape in end elevation its side elevation approximates a diamond shape. Thus its outer walls 20 converge to a circumferential vertex 21, and likewise its inner walls 22 converge to an internal circumferential vertex 23. Preferably the angle between the walls 22 is less than that between the walls 20 so that the body thickness is a maximum at the area of greatest strain and a minimum at the area of least strain. In this way the transmitted torque is absorbed and distributed so that shearing stresses do no harm.

In order to maintain stability in the structure and allow relative movement within limits between the ends of the device, a fulcrum dog 24 is positioned to bridge the space between the opposed ends of the members 10 and 11. The dog 24 has ball ends 25 and 26 which have a nice fit respectively in the members 10 and 11, the construction being such that each member 10 and 11 can not only turn on its ball, as a bearing, about the longitudinal axis of the aforesaid members but also turn on its ball, as a bearing, about an axis at right angles to the longitudinal axis. Bearing blocks 27 and 28, either of solid material, such as metal, or some suitable resilient material, are located respectively in the members 10 and 11 to properly locate the dog 24 in its operative position, each of these blocks about the adjacent shaft end to be held against improper end movement. To ensure proper cooperation each of the aforesaid blocks is formed with a concave socket 30 and 31 which is shaped to conform to the curvature of the associated end ball of the dog 24.

In order to allow a torsional wind-up or initial distortion of the resilient part of the device before bringing the fulcrum dog 24 into action, a pin 32 passes diametrically through the ball 25 with its ends projecting to respectively enter slots 33 and 34 in the member 10. Preferably these slots 33 and 34 have an arcuate length such that clearances are provided at both ends of the path of travel of the pin 32, and in consequence the member 10 can swing through an angle of approximately thirty degrees in either direction before picking up the pin 32 to introduce the rigid resistance of the fulcrum dog 24. The opposite end of the dog 24 is similarly connected to the member 11 by a lost motion connection including a pin 35, passing through the ball 26 and riding in slots 36 and 37 forming angular clearances. The pin 35, however, preferably lies in a plane at right angles to the plane of the pin 32 and thereby increases the resistance of the dog 24 to torsional fracture.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. A coupling comprising the combination of two opposed torque transmitting members, means for anchoring said members respectively to a driving shaft and a driven shaft, a flexible body connecting said members in end to end spaced apart relation, a rigid part disposed between said members, said part having ball-like ends interfitting respectively with said members, and connecting means between each ball and each member allowing a limited turning movement of each member relative to said part.

2. A coupling comprising the combination of two opposed torque transmitting members, means for anchoring said members respectively to a driving shaft and a driven shaft, a flexible body connecting said members in end to end spaced apart relation, each of said members having oppositely arranged slots therein, a rigid part disposed between said members, said part having ball-like ends interfitting respectively with said members, bearings for respectively seating said ends, and pins projecting from each ball end to ride respectively in the slots of said members, each of said pins having a thickness less than the width of the corresponding associated slots.

3. A coupling comprising the combination of two opposed torque transmitting members, means for anchoring said members respectively to a driving shaft and a driven shaft, a resilient tubular body associated with said members to form a unitary device, a fulcrum dog bridging the space between said members, means connecting one end of said dog to one member for movement about one predetermined axis, and means connecting the other end of said dog to the other member for movement about a different predetermined axis, whereby angular and parallel misalinement of said shafts is automatically compensated.

ALFRED WEILAND.